Figure 1:
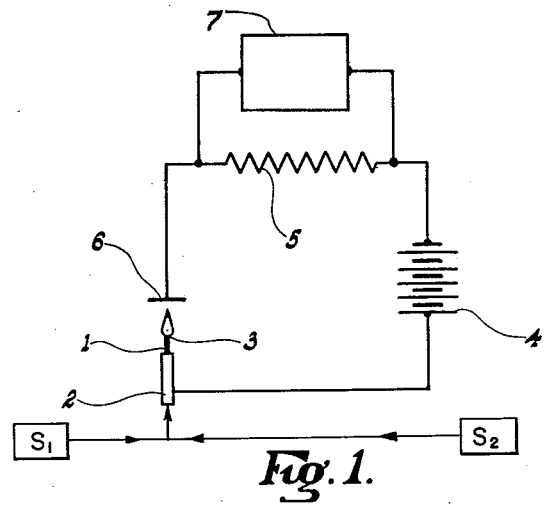

June 19, 1962

I. G. McWILLIAM 3,039,856

METHOD AND APPARATUS FOR DETECTING THE
PRESENCE OF ORGANIC GASES AND VAPOURS
Filed June 30, 1958

INVENTOR
IAN GORDON McWILLIAM

BY Cushman, Darby & Cushman
ATTORNEYS

United States Patent Office 3,039,856
Patented June 19, 1962

3,039,856
METHOD AND APPARATUS FOR DETECTING THE PRESENCE OF ORGANIC GASES AND VAPOURS
Ian Gordon McWilliam, Sandringham, Victoria, Australia, assignor to Imperial Chemical Industries of Australia and New Zealand, Limited, Melbourne, Victoria, Australia, a company of Australia
Filed June 30, 1958, Ser. No. 745,462
Claims priority, application Australia July 4, 1957
14 Claims. (Cl. 23—232)

There are many instruments for the detection and measurement of organic gases and vapours, making use of various effects such as changes in the degree of ionization induced by radioactive particles, changes in the temperature of a hydrogen flame, or changes in the density of a reference gas in the presence of organic gases and vapours.

We have found that, surprisingly, the electrical conductivity of a hydrogen flame, or the flame of a mixture of hydrogen and an inert gas such as nitrogen, burning in oxygen or diluted oxygen such as air, is increased to a marked degree when an organic gas or vapour is given access to the flame, either by adding the organic gas or vapour to the stream of hydrogen (or hydrogen mixed with inert gas) flowing to the burner, or by adding the organic gas or vapour to the oxygen in which the flame is burning.

It is accordingly the principal object of the present invention to provide apparatus whereby this increase in electrical conductivity may be used to detect the presence of organic gases or vapours.

In achieving the above-stated principal object, the present invention provides apparatus for detecting the presence of organic gases and vapours, comprising: a burner; means for supplying hydrogen or a mixture of hydrogen and an intert gas to the burner; means for feeding gas in which the organic gas or vapour is to be detected to the combustion zone of the burner; and means for detecting variations in the electrical conductivity of the hydrogen flame from the burner.

As most organic gases and vapours decompose at the temperature of the oxy-hydrogen flame, it is usually necessary to dilute either the hydrogen or the oxygen, or both, with an inert gas, for example nitrogen. In general, the cooler the flame, i.e. the more inert gas is added, the more extensively useful the apparatus becomes.

Preferably, the conductivity of the flame is measured between a portion of the burner and an electrode spaced therefrom and located in or just above the flame. By empirically calibrating the apparatus, it is possible to measure the concentration of organic gas or vapour in the gas being tested.

In one preferred form of the invention a mixture of, by volume, approximately 70% nitrogen and 30% hydrogen is burnt at the tip of a stainless steel jet made from a hypodermic needle, at such a flow rate that a flame about one to 2 centimetres in height is produced. An electrode consisting of a metal wire, plate or gauze is placed about 1 cm. above the flame. An electric battery of several hundred volts potential is connected to the jet needle as one electrode, and to the metal electrode above the flame as the other electrode, a resistance being connected in series in the circuit. The potential drop across the resistance produced by the passage of current through it is measured by means of a voltmeter or potentiometer.

Admission of an organic gas or vapour to the hydrogen/nitrogen stream then produces large changes in the reading of the voltmeter or potentiometer, and the whole instrument thus serves to detect, and by experimental calibration, to measure, the amount of the organic gas or vapour added. If, instead of the battery, a source of alternating potential of frequency, for example, between 10 and 1000 cycles per second is used, other detecting or measuring instruments may be employed.

The following examples illustrate the invention:

*Example 1*

A mixture of 70% by volume nitrogen and 30% by volume hydrogen was burnt at the tip of a stainless steel hypodermic needle, 1 cm. above which was placed a small circle of fine steel gauze. The positive pole of a 360 volt battery was connected to the stainless steel needle, the gauze electrode was connected to one end of a 200,000 ohm resistor, and the other end of the resistor was connected to the negative pole of the battery. A 10 millivolt self-balancing potentiometric recorder was connected across the 200,000 ohm resistor. Rapid addition, in turn, of one microgram each of various organic vapours, including ether, benzene, toluene and xylene, to the nitrogen/hydrogen stream caused the recorder to give full-scale deflection while the organic vapour was present. The deflection in the absence of an organic vapour was only about 1 millivolt, indicating that the resistance of the flame was very high in the absence of the organic vapour, and the large deflection obtained in the presence of the organic vapours indicated that the flame resistance fell very markedly in the presence of the organic vapours.

*Example 2*

An apparatus was constructed as described in Example 1 except that the 200,000 ohm resistor was replaced by a 100,000,000 ohm resistor across the input of a vibrating reed electrometer. This arrangement gave still more sensitive indication than the simple circuit of Example 1.

*Example 3*

Instead of a battery in the apparatus as described in Example 1, an alternating voltage of a frequency of 50 cycles per sec. was applied, and the output was measured by the trace on a cathode ray oscilloscope, or, after rectification, by a potentiometric recorder. A direct current in addition to the alternating voltage was found to modify the waveworm, and this effect may be advantageous when certain types of amplifier are used.

*Example 4*

Two jets were used, burning the same gas mixture, with a common upper electrode, and the two jets were energised by alternating voltages identical in amplitude but in antiphase. In the null condition therefore, when both jets were adjusted to equality, no net alternating current was detectable. On adding an organic vapour to either one of the jets, an alternating current output was obtained. This arrangement has the advantage that changes in the pressure of the gas supply affect both jets equally and do not disturb the null condition. The same two-jet system has also been used in a direct current circuit, to balance out fluctuation in the gas supply.

*Example 5*

Two burners were used, a measuring burner and a reference burner. The burners were each connected in the grid circuit of a pentode vacuum tube (Mullard Type ME1403) in parallel with a series connected battery of 500 volts and a grid resistor of $10^{10}$ ohms. The anodes of the vacuum tubes were each connected to a common 12 volt battery via a resistor of 15,000 ohms, the 12 volt battery being connected to the junction of the anode resistors. The output of one vacuum tube was balanced with the other by a balancing potentiometer connected to the screens of the tubes and to the 12 volt battery. A 10 millivolt Leeds and Northrop potentiometer recorder was connected in parallel with the series connected anode resistors and a sensitivity to diethyl ether of the order of 10-12 gram was achieved, unmistakable above background fluctuations being produced.

As in Example 4 changes in the pressure of the gas supply will affect both burners equally thus only variations due to changes in the conductivity of the gas will be indicated by the recorder.

Figure 2:
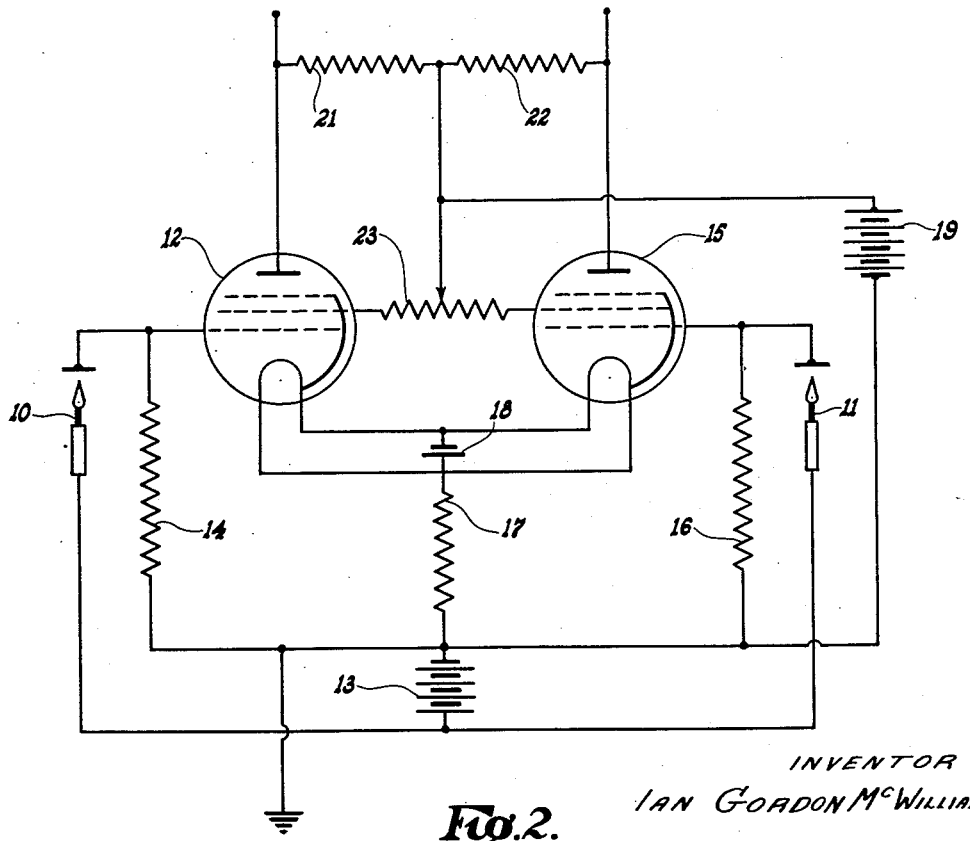

Practical arrangements of apparatus according to the invention will now be described with reference to the accompanying drawings in which FIGURE 1 is a circuit diagram of apparatus for use with a single burner, and FIGURE 2 is a circuit diagram of apparatus for use with two burners, i.e. a measuring burner and a reference burner.

Referring to FIGURE 1 a burner constituted by a vertical stainless steel hypodermic needle 1 is supplied through a pipe 2 with a gas consisting of a mixture of nitrogen and hydrogen which burns at the tip 3 of the needle. The mixture may be approximately 70 percent of nitrogen and 30 percent of hydrogen, by volume. The needle 1 is connected to one terminal of a battery 4 whilst the other terminal of the battery 4 is connected to one end of a resistor 5 the other end of the resistor 5 being connected to a wire gauze electrode 6 which is adapted to be placed in the flame of the burner 1. A recorder 7 is connected in parallel with the resistor 5. $S_1$ designates a source of organic gas or vapour to be tested and $S_2$ designates a source of hydrogen/nitrogen gas, $S_1$ and $S_2$ being operatively connected to the needle 1 through the pipe 2, as is apparent.

The introduction of an organic gas or vapour into the nitrogen/hydrogen gas mixture will cause the electrical conductivity of the flame produced by the needle 1 to vary with the result that the current flowing through the circuit and the voltage drop across the resistor 5 will vary. The variations in the voltage drop across the resistor 5 will be indicated by the recorder 7 which may be calibrated to indicate the amount of the organic gas or vapour. Likewise, the numeral 7 may designate a vibrating reed electrometer in parallel with a resistor of correspondingly higher value, as described in Example 2.

In FIGURE 2 of the drawings two burners constituted by hypodermic needles 10 and 11 are employed, one burner being a measuring burner and the other burner being a reference burner. The needle 10 is connected in the grid circuit of a vacuum tube 12 in parallel with the series connected battery 13 and grid resistor 14, the positive terminal of the battery 13 being connected to the needle. The needle 11 is connected in the grid circuit of a vacuum tube 15 in parallel with the series connected battery 13 and grid resistor 16. The grid to filament circuit of each vacuum tube is completed by a resistor 17 whilst the filaments of both tubes are heated by a battery 18.

The anode of the tube 12 and the anode of the tube 15 are connected to the positive terminal of a battery 19 via resistors 21 and 22 respectively, the battery 19 being connected to the junction of these resistors. The screens of the tubes 12 and 15 are connected by a potentiometer 23, the slider of which is connected to the positive terminal of the battery 19. The potentiometer 23 is adapted to function as a balancing potentiometer. A recorder such as a 10 millivolt Leeds and Northrop potentiometer recorder is connected in parallel with the series connected resistors 21 and 22. The negative terminal of the battery 19 is connected to the negative terminal of the battery 13 and to ground.

In the operation of the apparatus of FIGURE 2 the potentiometer 23 is adjusted to give a null reading on the recorder. Upon admission of an organic gas or vapour to the nitrogen/hydrogen gas mixture the electrical conductivity of the flame produced by the needle 10 will vary thus varying the effective voltage at the grid of the tube 12. This will cause the current flowing through the resistor 21 to vary and thus the voltage drop across this resistor will vary to produce a reading on the recorder which is dependent upon the change in the conductivity of the flame.

The instrument as described in the specification and examples can be usefully applied in chemical analysis by the method of gas chromatography, for the detection of toxic vapours in the air of factories, and other confined spaces, and for the control of processes in chemical factories, oil refineries and the like in which the detection and measurement of small amounts of organic gases and vapours are required.

Having now described my invention, what I claim as new and desire to secure by Letters Patent is:

1. The method of detecting the presence of an organic vapour in a gas which comprises passing the gas into the region of the combustion zone of a hydrogen fuel flame, and detecting the change in the electrical conductivity of the flame consequent upon the presence of the said organic vapour.

2. The method as claimed in claim 1 in which the fuel burning in said combustion zone includes a mixture of hydrogen and an inert gas.

3. The method as claimed in claim 1 in which the gas is added to a fuel mixture of hydrogen and inert gas supplied to the combustion zone.

4. The method claimed in claim 1 wherein a second hydrogen flame is provided and including the step of comparing the two flames to compensate for changes in the conductivity of the first-mentioned flame due to changes in the conductivity of the hydrogen in said flame by fluctuating gas pressures.

5. A process for detecting the presence of organic gases and vapours in a sample gas which comprises: furnishing a hydrogen-containing gas free from oxygen and organic compounds; burning this gas in a device constituting one electrode; adding the sample gas to the burning hydrogen-containing gas; and detecting, by means of a second electrode positioned adjacent to the flame, variations in the electrical conductivity of the flame due to the presence of the organic gases and vapours in said sample gas.

6. Process as claimed in claim 5 in which the hydrogen-containing gas comprises nitrogen and hydrogen.

7. The method of detecting the presence of organic gases and vapours in a sample gas which comprises: furnishing a stream of hydrogen-containing gas free from oxygen and organic compounds; burning the gas, without adding oxygen to the stream, adding the sample gas to the burning hydrogen containing gas; and determining the proportion of organic gases and vapours in the sample gas by measuring the change in the electrical conductivity of the flame consequent upon the presence of the said organic gases and vapours.

8. Apparatus for detecting the presence of organic gases and vapours comprising: a burner assembly having a bore therethrough of a size in the order of the magnitude of a hypodermic needle, the bore having an inlet end for receiving organic gases and vapours and a gaseous fuel free of organic gases and vapours, and an outlet end for burning the organic gases and vapours and the fuel; an electric circuit including two electrodes, one of said electrodes constituting said burner assembly, the other electrode being spaced adjacent the burner outlet end, said electric circuit being responsive to minute quantities of organic gases and vapours due to a change in the resistance of the flame which is detected by said electrodes to provide an output of said electric circuit responsive thereto.

9. Apparatus defined in claim 8 wherein said burner assembly is of stainless steel.

10. Apparatus defined in claim 8 wherein said electric circuit includes a battery with high resistance, and a self-balancing potentiometric recorder connected across said high resistance.

11. Apparatus defined in claim 8 wherein said electric circuit includes a source of direct current, a very high resistance, and a vibrating reed electrometer.

12. Apparatus for detecting the presence of organic gases and vapours comprising: electric circuit means including two electrodes, one of said electrodes constituting a burner assembly for emitting a flame, said burner assembly having a bore size in the order of magnitude of a hypodermic needle; first means providing a source of gaseous fuel free of organic vapours and gases but including hydrogen gas to said burner assembly bore; second means providing a source of a separate gas in which the organic vapour is to be detected, to said burner assembly bore; said electric circuit means being responsive to minute quantities of organic gases and vapours in said separate gas due to a change in the electrical resistance of the flame which is detected by said electrodes to provide an output of said electrical circuit means responsive thereto.

13. Apparatus for detecting the presence of organic gases and vapours comprising: first and second burner assemblies having a bore therethrough, means for supplying organic gases and vapours and a gaseous fuel free of organic gas and vapours to said first burner assembly; means for supplying a gaseous fuel only to said second burner assembly, electric circuit means operatively connected to said first and second burner assemblies for comparing the relative electrical conductivity of the flames emitted from said first and second burner assemblies whereby said second burner assembly compensates for fluctuating fuel gas pressures.

14. Apparatus defined in claim 13 wherein said electric circuit means includes first electrodes connected to each of said burner assemblies and second electrodes spaced from the respective outlets thereof whereby the change in electric conductivity is detected by said spaced apart electrodes.

References Cited in the file of this patent

UNITED STATES PATENTS

| | | |
|---|---|---|
| 2,324,821 | Campbell | July 20, 1943 |
| 2,343,001 | Cohen | Feb. 29, 1944 |
| 2,437,720 | Ackley | Mar. 16, 1948 |
| 2,511,177 | Richardson | June 13, 1950 |

OTHER REFERENCES

McWilliam et al.: "Nature," 181, 760 (1958).
Harley: "Nature," 181, 177, 178 (1958).